US012615133B2

(12) United States Patent
Xu et al.

(10) Patent No.: US 12,615,133 B2
(45) Date of Patent: Apr. 28, 2026

(54) METHOD AND SYSTEM FOR ENCRYPTION AND ASSURED DELETION OF INFORMATION

(71) Applicant: Huazhong University of Science and Technology, Wuhan (CN)

(72) Inventors: Peng Xu, Wuhan (CN); Mengyang Yu, Wuhan (CN); Wei Wang, Wuhan (CN); Yixin Su, Wuhan (CN); Yubo Zheng, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 135 days.

(21) Appl. No.: 18/631,621

(22) Filed: Apr. 10, 2024

(65) Prior Publication Data

US 2024/0364502 A1     Oct. 31, 2024

(30) Foreign Application Priority Data

Apr. 27, 2023     (CN) .......................... 202310472518.4

(51) Int. Cl.
 *G06F 21/00*     (2013.01)
 *H04L 9/08*     (2006.01)
 *H04L 9/32*     (2006.01)
 *H04L 29/06*     (2006.01)
(52) U.S. Cl.
 CPC .......... *H04L 9/0819* (2013.01); *H04L 9/0869* (2013.01); *H04L 9/3236* (2013.01)

(58) Field of Classification Search
None
See application file for complete search history.

(56) References Cited

U.S. PATENT DOCUMENTS 11,741,252 B1 *  8/2023  Yewchin ............. G06F 21/6227
                                                                726/26
2021/0136569 A1 *  5/2021  Obaidi .................. H04W 12/37

FOREIGN PATENT DOCUMENTS

CN          114629661          6/2022

* cited by examiner

*Primary Examiner* — Lisa C Lewis
(74) *Attorney, Agent, or Firm* — Kalos Athena Wang PLLC; Michael Ye

(57) ABSTRACT

A method and system for encryption and assured deletion of information is provided, the method at least includes: sorting fields of the information into at least two sensitivity levels by sensitivity; generating encryption keys and key shards thereof based on predetermined thresholds, and creating mapping between targets and the key shards, based on the encryption keys for the sensitivity levels, encrypting the information fields of the corresponding sensitivity levels and deleting the original information and encryption keys; and in response to reception of a recover request, recovering the encryption keys based on the key shards and performing decryption, so as to recover the original information. The present disclosure aims at the problem that information is difficult to be safely stored and assuredly deleted, and realizes multi-party security key deletion of encrypted personal information.

6 Claims, 1 Drawing Sheet

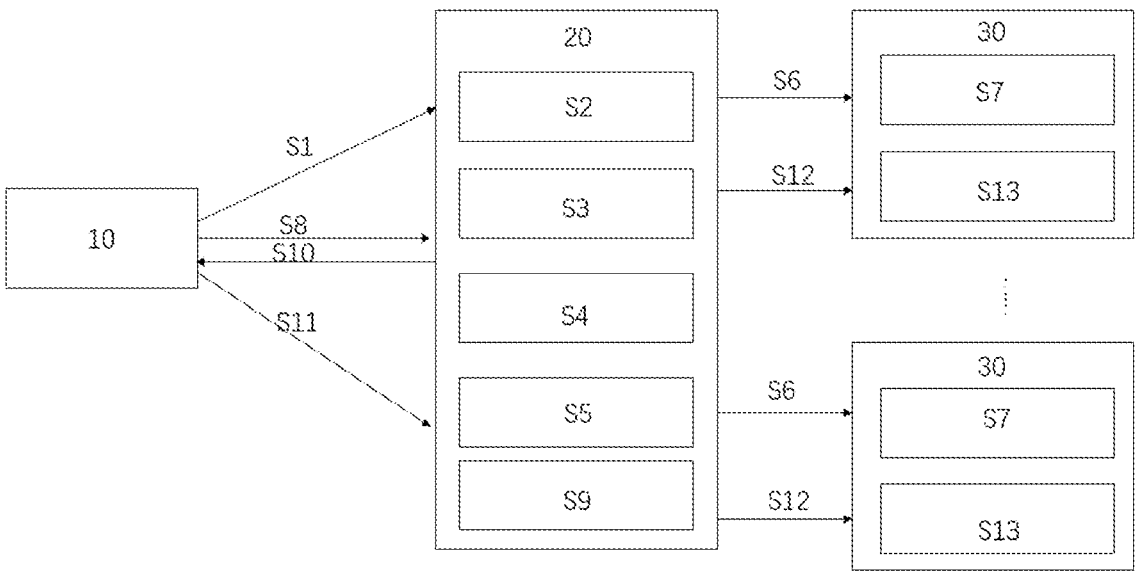

METHOD AND SYSTEM FOR ENCRYPTION AND ASSURED DELETION OF INFORMATION

This application claims priority to Chinese Patent Application No. CN 202310472518.4 filed on Apr. 27, 2023, which is hereby incorporated by reference as if fully set forth herein.

BACKGROUND OF THE APPLICATION

Field

The present disclosure generally relates to information security, and more particularly to a method and system for encryption and assured deletion of information.

Description of Related Art

In the current environment of the internet, service providers increasingly collect personal information of their user in order to offer services more relevant and often protect the collected personal data with encryption. When personal data have been encrypted, their non-restorability can be quite assured by simply deleting the corresponding keys. This process is usually known as encrypted deletion. By encrypting personal data this way, user privacy is basically protected by encryption-secured transmission, and further protected by deletion of keys.

Such a solution, however, makes storage of encryption keys the critical issue for data security. A broken key makes restoration of original data impossible. In order to enhance reliability of key storage, an existing approach is to store copies of a key into different nodes across the system in a distributed manner. In this case, even if a node is failed, the other nodes can still ensure the key copies can be used to recover the encrypted data. Additionally, for applications where security is highly demanded, after all relevant copies of keys have been deleted, personal data in the form of ciphertext have to be deleted as well to further ensure non-restorability of the personal data.

While the existing methods for encrypted deletion are basically work, they are relatively less resistant to potential incidents. Concerns about data stored with encryption mainly exist in two aspects. The first is that the server where data are stored may have failure itself and lose the stored data. The second is that the server are attacked and the stored data are stolen. As to encrypted personal data, if the system only stores one key, it is possible that the key will be lost when a single point of failure happens and make data restoration impossible. Or, if the server is invaded by an attacker, the risk that the single node gets attacked is quite high. After the server is invaded, the attacker can use the key to acquire the original data, leading to privacy breach. An improved solution is to store copies of a key onto different nodes. While this ensures that ciphertext data can be recovered in case of a single point of failure, an attacker after invading can still use the spoils to recover the original data. Briefly, simply storing copies of a key onto multiple nodes is ineffective in reducing the risk of data breach.

For example, China Patent Publication No CN114629661A discloses an encrypted information processing method. The method comprises: encrypting the shared information by using plaintext keys to obtain a shared information ciphertext; encrypting the key plaintext keys according to the time trapdoor parameter to obtain a first key ciphertext; encrypting each leaf node according to the node index information of each leaf node in the access policy tree to obtain a leaf node ciphertext of each leaf node; processing the preset deleting moment information and the time trapdoor parameters according to the Hash function to generate a time trapdoor as the processing result; storing the access policy tree, the shared information ciphertext, the time trapdoor, the first key ciphertext and the leaf node ciphertext of each leaf node into different information blocks in the initial information chain to obtain a target information chain; sending the target information chain to a cloud server; generating a first information deletion request according to preset deletion moment information and a target private key; and sending the first information deletion request to the trusted authority. It is obvious that in the event that when the server has any failure, the steps of encrypting and deleting information tend to see data loss, and the server is highly vulnerable to attacks and unauthorized data disclosure.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY

In view of the shortcomings of the existing art, the present disclosure provides a method for encryption and assured deletion of information, wherein the method at least comprises:

sorting fields of the information into at least two sensitivity levels by sensitivity;

generating encryption keys and key shards thereof based on predetermined thresholds, and creating mapping between targets and the key shards, based on the encryption keys for the sensitivity levels, encrypting fields of the corresponding sensitivity levels and deleting the original information and encryption keys; and in response to reception of a recover request, recovering the encryption keys based on the key shards and performing decryption, so as to recover the original information.

Preferably, the method further includes: in the step of deleting the original information of the designated sensitivity levels, deleting the key shards corresponding to the sensitivity levels.

Preferably, the method further includes: in the step of deleting the original information of the designated sensitivity levels, making configuration such that any of the fields that has the sensitivity level higher than the sensitivity levels of the key shards having been deleted is not accessible.

Preferably, the method further includes: the step of creating mapping between the targets and the key shards is performed by means of key management based on multiparty collaboration.

Preferably, the means of the key management based on the multi-party collaboration at least comprises:

where there are n servers perform the key management based on the multi-party collaboration on the encryption keys, using the encryption keys to generate the key shards in the number of n based on the predetermined threshold t; collecting the key shards of not less than the threshold t so as to recover the encryption keys; based on the predetermined sensitivity levels, randomly generating the encryption keys; and sharding the encryption keys so as to generate the key shards.

Preferably, the step of sharding the encryption keys at least comprises: based on the threshold t, randomly generating t−1 coefficients $a_j$; constructing t−1-th degree polynomial $$f(x) = a_{t-1}x^{t-1} + \ldots + a_2x^2 + \ldots + a_1x^1 + K_i,$$

where $K_i$ represents the encryption key, $a_{t-1}$ represents the coefficient $a_j$; and x represents a variable; plugging randomly generated n nonzero numbers $x_k$ into the t−1-th polynomial, and taking resulting $(x_k, f(x_k))$ as n key shards, where $1 \leq k \leq n$; and when t=n, each of the encryption keys generates n key shards, collecting all the n key shards, and recovering the original encryption keys.

Preferably, the step of recovering the encryption keys using the key shards at least comprises: selecting n random values, and marking the key shards as $$\{K_m^1, K_m^2, \ldots, K_m^n\};$$

performing an XOR operation $$K_m^1 \oplus K_m^2 \oplus \ldots \oplus K_m^n$$

on the key shards, taking a first result $K_m$ as the encryption key for the sensitivity level $L_m$, wherein $$\{K_m^1, K_m^2, \ldots, K_m^n\}$$

are the key shards corresponding to the first result $K_m$; performing a Hash operation $$\text{Hash}\left(K_m^i\right)$$

on the key shards $$K_m^i (1 \leq i \leq n),$$

and marking a second result as $$K_{m-1}^i;$$

and performing an XOR operation $$K_{m-1}^1 \oplus K_{m-1}^2 \oplus \ldots \oplus K_{m-1}^n$$

4 on the n key shards, and marking a third result as $K_{m-1}$, wherein the third result $K_{m-1}$ is the encryption key for the sensitivity level $L_{m-1}$, and $$\{K_{m-1}^1, K_{m-1}^2, \ldots, K_{m-1}^n\}$$

are the key shards corresponding to third result $K_{m-1}$.

The present disclosure further provides a system for encryption and assured deletion of information, wherein the system at least includes a processor that is for: sorting fields of the information into at least two sensitivity levels by sensitivity; generating encryption keys and key shards thereof based on predetermined thresholds; and creating mapping between targets and the key shards, based on the encryption keys for the sensitivity levels, encrypting fields of the corresponding sensitivity levels and deleting the original information and encryption keys; and in response to reception of a recover request, recovering the encryption keys based on the key shards and performing decryption, so as to recover the original information.

Preferably, the processor is further for: in the step of deleting the original information of the designated sensitivity levels, deleting the key shards corresponding to the sensitivity levels.

Preferably, the processor is further for:

in the step of deleting the original information of the designated sensitivity levels, making configuration such that any of the fields that has the sensitivity level higher than the sensitivity levels of the key shards having been deleted is not accessible.

The present disclosure manages keys for encrypting personal data in two ways. The first is to classify personal data by sensitivity level, and partition it into fields of different sensitivity levels. Then the fields of different sensitivity levels are encrypted using different encryption keys before stored. A user having access to fields of a certain sensitivity level also has access to fields of sensitivity levels lower than that level, but not vice versa. The second way is to store keys of each sensitivity level in a distributed manner, so as to protect the keys from stealing or leakage. In terms of distributed storage, the present disclosure provides two mechanisms. For servers tending to have single points of failure, the keys are managed using a (n, t) threshold. Specifically, n key shards of an encryption key are distributed to n servers, and the key can be recovered by collecting t of the all key shards. This way provides a certain extent of fault tolerance. In the event of a single point of failure in a server, keys can still be recovered normally. Second, for a server cluster not tending to have a single point of failure, n key shards are generated for a key and distributed to n servers, respectively. The key can only be recovered when all the n key shards are collected. By sharding a key in this way, restoration of the key can be completely prevented by simply deleting the key shards in any of the servers, and the keys of low sensitivity levels can be derived from the keys of high sensitivity levels, so as to reduce storage overheads in servers for key shards.

BRIEF DESCRIPTION OF THE DRAWINGS

FIG. 1 is a method for encryption and assured deletion of information according to a preferred mode of the present disclosure.

DETAILED DESCRIPTION

The present disclosure will be further detailed below with reference to accompanying drawings and particular embodiments.

Some terms used herein are defined below.

A threshold is a critical value at which a key can started to be recovered. For example, if the threshold is t, the key can be recovered by collecting t or more key shards.

A key shard refers to a part of an original encryption key that has been separated into multiple parts by means of a certain algorithm, wherein each of the parts is a key shard of the original encryption key.

Multi-party collaboration refers to collaborative works among multiple computing entities (e.g., computers, servers, etc.) for the purpose of fulfilling a certain task.

The present disclosure provides a method and system for encryption and assured deletion of information. The present disclosure further provides a system for information security management and its method. The present disclosure further provides a method for information recovery and its system.

The system of the present disclosure may be a system for encryption and assured deletion of information, or may be a system for information security management, or may be a system for information restoration.

The system of the present disclosure at least comprises processors. The processors may include a first server 20 and a second server 30. The first server 20 and the second server 30 are in wired and/or wireless information communication. The first server 20 is for receiving information from an arbitrary terminal, and performing encryption and/or storage on the information. The first server 20 is further used to respond to a deletion request and/or an information retrieval request issued by an arbitrary terminal to retrieve and/or delete the designated information.

While the operation of the disclosed system will be further explained with reference to personal data as an example, the system of present disclosure is actually applicable to encryption, deletion and restoration of information of various types.

Preferably, the first server 20 classifies personal data by sensitivity level, and generates corresponding encryption keys. Then it encrypts personal data and distributes key shards to other second servers 30. When a relevant personal data subject intends to retrieve the personal data, the first server 20 recovers the keys according to the key shards and decrypts the personal data. When a personal data subject intends to delete the personal data, the first server 20 sends an instruction to the second server 30 to ask for deletion of the keys.

The second server 30 is for, upon reception of a delete instruction from the first server, deleting the key shards corresponding to the encryption keys.

In the present disclosure, the processing hardware in the first server 20 and the second server 30 may be application-specific integrated circuits, CPUs, logic processors, etc., and may further include any device capable of reading code data used for the method of present disclosure and stored in a disk-type medium and implementing the method of the present disclosure.

In the present disclosure, the first server 20 and the second server 30 may alternatively be integrated as a single processor to implement the method of the present disclosure.

Embodiment 1

The system of the present disclosure at least comprises processors. The processors may include a first server 10 and a second server 30.

The first server is for:

sorting fields of the information into at least two sensitivity levels by sensitivity;

generating encryption keys and key shards thereof based on predetermined thresholds, and creating mapping between targets and the key shards;

based on the encryption keys for the sensitivity levels, encrypting fields of the corresponding sensitivity levels and deleting the original information and encryption keys; and in response to reception of a recover request, recovering the encryption keys based on the key shards and performing decryption, so as to recover the original information.

Specifically, the first server 20 is in information communication with at least one terminal 10 in a wired and/or wireless manner. The terminal 10 refers to a device capable of receiving information and conducting human-machine interaction. The terminal may be, for example, a computer, a tablet, a smartphone, a smart watch, smart glasses, a VR device, or any other device capable of entering and transmitting personal data.

Specifically, at S1, the first server 20 receives information sent by the at least one terminal 10.

At S2, the first server 20 sorts the designated information according to the sensitivity degree of the information. The designated information may include, but is not limited to, personal data, and may further include financial information, trading information, or any other confidential information.

For example, the information is sorted into several levels, namely $\{L_1, L_2, \ldots, L_m\}$. $L_1$ is the lowest level and $L_m$ is the highest level. For information I, the first server 20 divides fields of the information I into m parts $\{I_1, I_2, \ldots, I_m\}$ by sensitivity.

The information thus is divided into fields of different sensitivity levels. Then the fields of different sensitivity levels are encrypted using a corresponding encryption key before storage. A user having access to fields of a certain sensitivity level also has access to fields of sensitivity levels lower than that level, but not vice versa.

At S3, according to the current operating state of the system, the first server 20 selects a key shard threshold t.

There are two alternative operating states, indicating that none of the servers has undergone a crash recently, and that one or more of the servers has undergone one or more crashes recently, respectively. The selection corresponding to the former state is the threshold t=n. Otherwise, the selection is the threshold t<n.

The threshold t is a positive integer having a range of $1 \leq t \leq n$.

At S4, the first server 20 randomly generates encryption keys $\{K_1, K_2, \ldots, K_m\}$ using a policy depending on the threshold t, and shards the encryption keys.

When the threshold t<n, the selected policy includes the steps S41, S42, and S43.

When the threshold t=n, the selected policy includes the steps S44, S45, and S46.

The first server 20 uses the encryption keys $\{K_1, K_2, \ldots, K_m\}$ to encrypt information fields $\{I_1, I_2, \ldots, I_m\}$ so as to generate ciphertext information $\{C_1, C_2, \ldots, C_m\}$.

The first server 20 may further use at least t key shards to recover the encryption key, and manage the keys by means of multi-party collaboration. It creates mapping between targets and key shards. A target refers to an object to be deleted.

In an example, that there are n servers in the domain, and the n servers are used to manage encryption keys based on multi-party collaboration. The threshold is now set as t. When t<n, the first server 20 generates n key shards for each encryption key. This means that by having at least t key shards collected, the original encryption key can be recovered.

The encryption key is generated by:

according to the sensitivity levels $\{L_1, L_2, \ldots, L_m\}$, randomly generating the encryption keys $\{K_1, K_2, \ldots, K_m\}$, respectively.

Herein, the foregoing random generation is achieved by: determining the length of the key, generating a random number of a corresponding length, and processing the random number so as to obtain the key.

To sort user information into different sensitivity levels, the criterion may include how much the information affects personal privacy, and how much its breach threatens personal security.

For example, the user information may include fields of the ID number, the telephone number, the address, the gender, and the name of the user. Therein, the telephone number and the gender are of the low sensitivity level $L_1$, and the name is of the middle sensitivity level $L_2$, while the ID number and the address are of the high sensitivity level $L_3$.

Sharding each encryption key $K_i(1 \leq i \leq m)$ is accomplished through the following steps.

At S41, based on the encryption key $K_i$ and the threshold t, t−1 random numbers $a_j(1 \leq j \leq t-1)$ are generated as coefficients, where $a_j$ is a natural number.

At S42, the encryption key $K_i$ is used as a constant term, and a t−1-th degree polynomial is constructed:

$$f(x) = a_{t-1}x^{t-1} + \ldots + a_2x^2 + \ldots + a_1x^1 + K_i.$$

At S43, n nonzero numbers $x_k(1 \leq k \leq n)$ are randomly generated, and are plugged into the t−1-th degree polynomial, so as to obtain data $(x_k, f(x_k))$, $1 \leq k \leq n$.

The data $(x_k, f(x_k))$ are used as n key shards. The n key shards corresponding to the encryption key $K_i$ are expressed as $$\{K_i^1, K_i^2, \ldots, K_i^n\}.$$

When t=n, for every encryption key, n key shards are generated. Only when all the n keys are collected, can the original encryption key be recovered.

Preferably, creating mapping between the targets and the key shards is achieved by performing the following steps.

At S44, n random values are selected, and the key shards are marked as key shards $$\{K_m^1, K_m^2, \ldots, K_m^n\}.$$

At S45, for the n key shards, an XOR operation $$K_m^1 \oplus K_m^2 \oplus \ldots \oplus K_m^n$$

is performed, and the first result is marked as $K_m$. The first result $K_m$ is the encryption key for the sensitivity level $L_m$. The key shards $$\{K_m^1, K_m^2, \ldots, K_m^n\}$$

are key shards corresponding to the first results $K_m$.

At S46, for the key shards $$K_m^i(1 \leq i \leq n),$$

a Hash operation $$\text{Hash}\left(K_m^i\right)$$

is performed, and the second result is marked as $$K_{m-1}^i.$$

For the n key shards, an XOR operation $$K_{m-1}^1 \oplus K_{m-1}^2 \oplus \ldots \oplus K_{m-1}^n$$

is performed, and the third result is marked as $K_{m-1}$. The third result $K_{m-1}$ is the encryption key for the sensitivity level $L_{m-1}$, and $$\{K_{m-1}^1, K_{m-1}^2, \ldots, K_{m-1}^n\}$$

are key shards corresponding to the third result $K_{m-1}$.

The key shards corresponding to each sensitivity level $L_i$ are derived from the key shards of the lever $L_{i+1}$ that is one level higher. The encryption key corresponding to the lowest sensitivity level $L_1$ is $K_1$, and $$\{K_1^1, K_1^2, \ldots, K_1^n\}$$

are the key shards corresponding to $K_1$.

With the threshold set as t<n, the original encryption key can only be recovered when t or more key shards have been collected. Since each of the key shards is obtained through many algebraic operations, the ability to recover the original encryption key is at the cost of numerous complicated computing operations. With the threshold set as t=n, the original encryption key can be recovered when all the n key shards have been collected. Thus, using Hash operations and XOR operations to obtain the key shards is advantageous as its computing process is much faster than the previous approach.

At S5, the first server 20 deletes the original information, and deletes the encryption keys.

At S6, the first server 20 distributes the key shards to the second servers 30.

The keys for the individual sensitivity levels are all stored in a distributed manner, so as to protect the keys from attacks or data breach.

At S51, the encryption keys $\{K_1, K_2, \ldots, K_m\}$ are used to encrypt the information fields $\{I_1, I_2, \ldots, I_m\}$ of different sensitivity levels, so as to obtain the ciphertext information $\{C_1, C_2, \ldots, C_m\}$.

At S52, the original information fields $\{I_1, I_2, \ldots, I_m\}$ are deleted and the original information/is deleted.

At S53, when t<n, the encryption keys $\{K_1, K_2, \ldots, K_m\}$ for all the sensitivity levels are deleted. For every encryption key, the corresponding n key shards are distributed to n second servers 30, respectively. At this time, every second server 30 stores m key shards, corresponding to m sensitivity levels, respectively.

When t=n, the encryption keys $\{K_1, K_2, \ldots, K_m\}$ for all sensitivity levels are deleted, and all key shards corresponding to the encryption keys $\{K_1, K_2, \ldots, K_{m-1}\}$ are deleted. For the key shards $$\{K_m^1, K_m^2, \ldots, K_m^n\}$$

corresponding to the encryption key $K_m$, the n key shards are distributed to n second servers 30, respectively.

At S7, the second servers 30 stores the corresponding key shards.

At S8, the terminal 10 issues a retrieval request that asks for personal data of the sensitivity level $L_i$, and the first server 20 receives the retrieval request.

At S9, the first server 20 collects t key shards from at least t second servers 30 to recover the corresponding encryption key $K_i$, and to in turn recover the information $I_i$ of the sensitivity level $L_i$ through decryption.

To recover information of the sensitivity level $L_i$, it is necessary to recover the encryption key $K_i$ having the corresponding level.

When t<n, in order to decrypt the encryption key $K_i$, t-th degree linear equations are constructed using t key shards collected from t servers, where $(x_i, f(x_i))$ are both key shards, as known values in the following equations.

$$\begin{cases} x_1 a_1 + x_1^2 a_2 + \ldots + x_1^{t-1} a_{t-1} + K_i = f(x_1) \\ x_2 a_1 + x_2^2 a_2 + \ldots + x_2^{t-1} a_{t-1} + K_i = f(x_2) \\ \ldots \ldots \\ x_t a_1 + x_t^2 a_2 + \ldots + x_t^{t-1} a_{t-1} + K_i = f(x_t) \end{cases}.$$

For a server cluster tending to have single points of failure, the encryption keys are managed using the (n, t) threshold. Specifically, n key shards of an encryption key are distributed to n servers, and the key can be recovered by collecting t of the all key shards. This provides a certain extent of failure tolerance. When some server has a single point of failure, the key can still be recovered normally.

When t=n, n key shards $$\{K_w^1, K_w^2, \ldots, K_w^n\}$$

have to be collected from n servers. That is, the current second server 30 stores the key shards corresponding to the sensitivity level $L_w$. Then Hash operations are performed on all the key shards $$\{K_w^1, K_w^2, \ldots, K_w^n\}$$

for w−i times, respectively, so as to obtain the key shards $$\{K_i^1, K_i^2, \ldots, K_i^n\}$$

corresponding to the encryption key $K_i$. Afterward, XOR operation is performed on these key shards, so as to obtain the encryption key $K_i$, namely $$K_i^1 \oplus K_i^2 \oplus \ldots \oplus K_i^n = K_i.$$

For a server cluster not tending to have a single point of failure, n key shards are generated for a key and distributed to n servers, respectively. The key can only be recovered when all the n key shards are collected. By sharding a key in this way, restoration of the key can be completely prevented by simply deleting the key shards in any of the servers, and the keys of low sensitivity levels can be derived from the keys of high sensitivity levels, so as to reduce storage overheads in servers for key shards.

By using the encryption key $K_i$ to decrypt the ciphertext $C_i$ of the corresponding sensitivity level, the personal data field $I_i$ can be recover in the form of plaintext.

At S10, the first server 20 returns the information $I_i$ to the terminal 10.

At S11, the terminal 10 issues a request for deleting information of the sensitivity level $L_i$.

At S12, the first server 20 sends a delete instruction to the second servers 30.

At S13, the corresponding key shards are deleted from the second servers 30, so as to ensure that it is impossible to recover the key $K_j(i \leq j \leq m)$ using the remaining key shards. At this time, only the encryption keys $\{K_1, K_2 \ldots K_{i-1}\}$ can still be recovered using key shards.

Deleting information of a certain sensitivity level is accomplished as below.

For deleting information having the sensitivity level $L_i$, encryption key $K_i$ of the corresponding level has to be deleted, and key shards higher than this level have also to be deleted, so as to prevent personal data higher than that sensitivity level from being recovered.

When t<n, for every encryption key $K_j(i \leq j \leq m)$, at least $K_j$ key shards on n−t+1 servers have to be deleted, so as to ensure that the key $K_j$ cannot be recovered using the remaining key shards. At this time, only the encryption keys $\{K_1, K_2, \ldots, K_{i-1}\}$ can still be recovered using key shards.

When t=n, the Hash operation is first performed on the existing encryption key shards $$\{K_w^1, K_w^2, \ldots, K_w^n\}$$

for w−i+1 times, so as to obtain the key shards $$\{K_{i-1}^1, K_{i-1}^2, \ldots, K_{i-1}^n\},$$

which are the key shards corresponding to $K_{i-1}$. Then any one of the key shards $$\{K_w^1, K_w^2, \dots, K_w^n\}$$

is deleted. At this time, it is impossible to recover the encryption key $K_w$ using the remaining key shards, and it is impossible to derive and recover the encryption keys $\{K_{w-1}, K_{w-2} \dots, K_i\}$ using the remaining key shards. Yet, by using the key shards $$\{K_{i-1}^1, K_{i-1}^2, \dots, K_{i-1}^n\},$$

the encryption keys $K_{i-1}$ can be recovered. Alternatively, the desired derivation and recovery of $\{K_1, K_2, \dots, K_{i-2}\}$ can be achieved using the key shards of $K_{i-1}$.

At last, the key shards stored at each node are updated to $$\{K_{i-1}^1, K_{i-1}^2, \dots, K_{i-1}^n\}.$$

Embodiment 2

The present embodiment represents a further improvement of Embodiment 1, and repeated description is omitted herein.

A method for encryption and assured deletion of information of the present embodiment has the following features.

Preferably, the method further comprises: in the step of deleting the original information of the designated sensitivity levels, deleting the key shards corresponding to the sensitivity levels.

Preferably, the method further comprises: in the step of deleting the original information of the designated sensitivity levels, making configuration such that any of the fields that has the sensitivity level higher than the sensitivity levels of the key shards having been deleted is not accessible.

Preferably, the step of creating mapping between the targets and the key shards is performed by means of key management based on multi-party collaboration.

Preferably, the means of key management based on multi-party collaboration at least comprises:

to have n servers manage encryption keys based on multi-party collaboration, generating n key shards for an encryption key based on a preset threshold t; collecting the key shards of not less than the threshold t to recover the original encryption key; randomly generating the encryption key based on a predetermined sensitivity level; sharding the encryption key so as to generate the key shards.

Preferably, sharding the encryption key is achieved by: based on the threshold t, randomly generating t−1 coefficients $a_j$; constructing a t−1-th degree polynomial $$f(x) = a_{t-1}x^{t-1} + \dots + a_2 x^2 + \dots + a_1 x^1 + K_i,$$

where $K_i$ represents the encryption key, $a_{t-1}$ represents the coefficient $a_j$, and x represents the variable; plugging randomly generated n nonzero numbers $x_k$ into the t−1-th polynomial, and taking the resulting $(x_k, f(x_k))$ as n key shards, where $1 \leq k \leq n$; and when t=n, generating n key shards for each of the encryption keys, and collecting all the n shards to recover the original encryption key.

Preferably, the step of recovering the encryption keys using the key shards at least comprises: selecting n random values, and marking the key shards as $$\{K_m^1, K_m^2, \dots, K_m^n\};$$

performing an XOR operation $$K_m^1 \oplus K_m^2 \oplus \dots \oplus K_m^n$$

on the key shards, taking a first result $K_m$ as the encryption key for the sensitivity level $L_m$, wherein $$\{K_m^1, K_m^2, \dots, K_m^n\}$$

are the key shards corresponding to the first result $K_m$; performing a Hash operation $$\text{Hash}\left(K_m^i\right)$$

on the key shards $$K_m^i (1 \leq i \leq n),$$

and marking a second result as $$K_{m-1}^i;$$

and performing an XOR operation $$K_{m-1}^1 \oplus K_{m-1}^2 \oplus \dots \oplus K_{m-1}^n$$

on the n key shards, and marking a third result as $K_{m-1}$, wherein the third result $K_{m-1}$ is the encryption key for the sensitivity level $L_{m-1}$, and $$\{K_{m-1}^1, K_{m-1}^2, \dots, K_{m-1}^n\}$$

are the key shards corresponding to third result $K_{m-1}$. The n key shards are distributed to n servers.

The process of recovering personal data of a certain sensitivity level is as below.

To recover personal data of the sensitivity level $L_i$, it is necessary to recover the corresponding encryption key $K_i$.

When t<n, in order to decrypt the encryption key $K_i$, t-th degree linear equations are constructed using t key shards collected from t servers, which are key shards corresponding to $K_{i-1}$. Then any one of the key shards $$\left\{ x_1 a_1 + x_1^2 a_2 + \ldots + x_1^{t-1} a_{t-1} + K_i = f(x_1) \atop x_2 a_1 + x_2^2 a_2 + \ldots + x_2^{t-1} a_{t-1} + K_i = f(x_2) \right.$$
$$\ldots \ldots$$
$$x_t a_1 + x_t^2 a_2 + \ldots + x_t^{t-1} a_{t-1} + K_i = f(x_t)$$

$$\left\{ K_w^1, K_w^2, \ldots, K_w^n \right\}$$

When t=n, n key shards is deleted. At this time, it is impossible to recover the encryption key $K_w$ with the remaining key shards, and it is also impossible to use the remaining key shards to derive and recover the encryption keys $\{K_{w-1}, K_{w-2} \ldots, K_i\}$. Nevertheless, it is possible to recover the encryption keys $K_{i-1}$ with the key shards $$\left\{ K_w^1, K_w^2, \ldots, K_w^n \right\}.$$

Have to be collected from n servers. That is, currently stored in the servers are the key shards corresponding to the sensitivity level $L_w$. Then a Hash operation is performed on all the key shards $$\left\{ K_{i-1}^1, K_{i-1}^2, \ldots, K_{i-1}^n \right\},$$

$$\left\{ K_w^1, K_w^2, \ldots, K_w^n \right\}$$

and it is also possible to achieve derivation and recovery of $\{K_1, K_2, \ldots, K_{i-2}\}$ by using the key shards of $K_{i-1}$. At last, the key shards stored at the individual nodes are updated to for w−i times, respectively, so as to obtain the key shards $$\left\{ K_{i-1}^1, K_{i-1}^2, \ldots, K_{i-1}^n \right\}.$$

$$\left\{ K_i^1, K_i^2, \ldots, K_i^n \right\}$$

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor.

corresponding to the encryption key $K_i$. Afterward, an XOR operation is performed on these key shards, so as to obtain the encryption key $K_i$, namely $$K_i^1 \oplus K_i^2 \oplus \ldots \oplus K_i^n = K_i.$$

The encryption key $K_i$ is used to decrypt the ciphertext $C_i$ of the corresponding sensitivity level, so as to recover the personal data field $I_i$ in the form of plaintext.

Deleting personal data of a certain sensitivity level is achieved as below.

To delete personal data of the sensitivity level $L_i$, the corresponding encryption key $K_i$ has to be deleted, and key shards higher than the level have also to be deleted, so that personal data higher than the sensitivity level cannot be recovered.

When t<n, to ensure that it is impossible to recover the key $K_j$ using the remaining key shards, for every encryption key $K_j$ (i≤j≤m), the $K_j$ key shards on at least n−t+1 servers have to be deleted. At this time, only the encryption keys $\{K_1, K_2, \ldots, K_{i-1}\}$ can still be recovered using key shards.

When t=n, the first step is to perform a Hash operation on the existing encryption key shards $$\left\{ K_w^1, K_w^2, \ldots, K_w^n \right\}$$

for w−i+1 times, so as to obtain key shards $$\left\{ K_{i-1}^1, K_{i-1}^2, \ldots, K_{i-1}^n \right\},$$

What is claimed is:

1. A method for encryption and assured deletion of information, the method comprising the steps of:
   sorting fields of original information into at least two sensitivity levels wherein a user having access to fields of a certain sensitivity level also has access to fields of sensitivity levels lower than that level, but not vice versa;
   generating an encryption key and key shards thereof based on a predetermined threshold at each sensitivity level, and creating mapping between the fields of the original information and the key shards at each sensitivity level,
   based on the encryption keys at each sensitivity level, encrypting fields of the original information at the corresponding sensitivity level and deleting the fields of the original information and the encryption key; and
   in response to a recover request, recovering the encryption key based on the key shards at each sensitivity level and performing decryption of encrypted fields of the original information, so as to recover the original information,
   wherein the steps of sorting fields of original information and generating encryption key and key shards thereof is performed by a primary server, wherein the primary server distributes the key shards to one or more secondary servers, and wherein the recover request is issued by an arbitrary terminal.

2. The method of claim 1, wherein the step of generating an encryption key and key shards thereof based on a predetermined threshold for at each sensitivity level and creating mapping between the fields of the original information and the key shards is performed by means of key management based on multi-party collaboration.

3. The method of claim 1, wherein the step of recovering the encryption key comprises:

collecting the key shards of not less than the predetermined threshold so as to recover the encryption key.

4. A system for encryption and assured deletion of information, the system comprising one or more processors and at least one memory, configured to:

sorting fields of original information into at least two sensitivity levels wherein a user having access to fields of a certain sensitivity level also has access to fields of sensitivity levels lower than that level, but not vice versa;

generating an encryption key and key shards thereof based on a predetermined threshold at each sensitivity level, and creating mapping between the fields of original information and the key shards, based on the encryption keys at each sensitivity level, encrypting fields of the original information at the corresponding sensitivity level and deleting the original information and the encryption keys; and in response to reception of a recover request, recovering the encryption keys based on the key shards and performing decryption of encrypted fields of the original information, so as to recover the original information, wherein the one or more processors comprise a primary server for receiving original information from an arbitrary terminal and performing encryption and/or storage of the original information, and wherein the primary server distributes the key shards to one or more secondary servers.

5. The system of claim 4, wherein the step of generating encryption keys and key shards thereof based on a predetermined threshold for each encryption key and creating mapping between the original information and the key shards is performed by means of key management based on multi-party collaboration.

6. The system of claim 4, wherein the step of recovering the encryption key comprises:

collecting the key shards of not less than the predetermined threshold so as to recover the encryption key.

\* \* \* \* \*